July 25, 1961         H. K. GLEASMAN         2,993,389

SEMI-AUTOMATIC TWO-SPEED HUB GEARING FOR VELOCIPEDES

Filed Oct. 5, 1959         2 Sheets-Sheet 1

INVENTOR.
Hollis K. Gleasman
BY
ATTORNEY

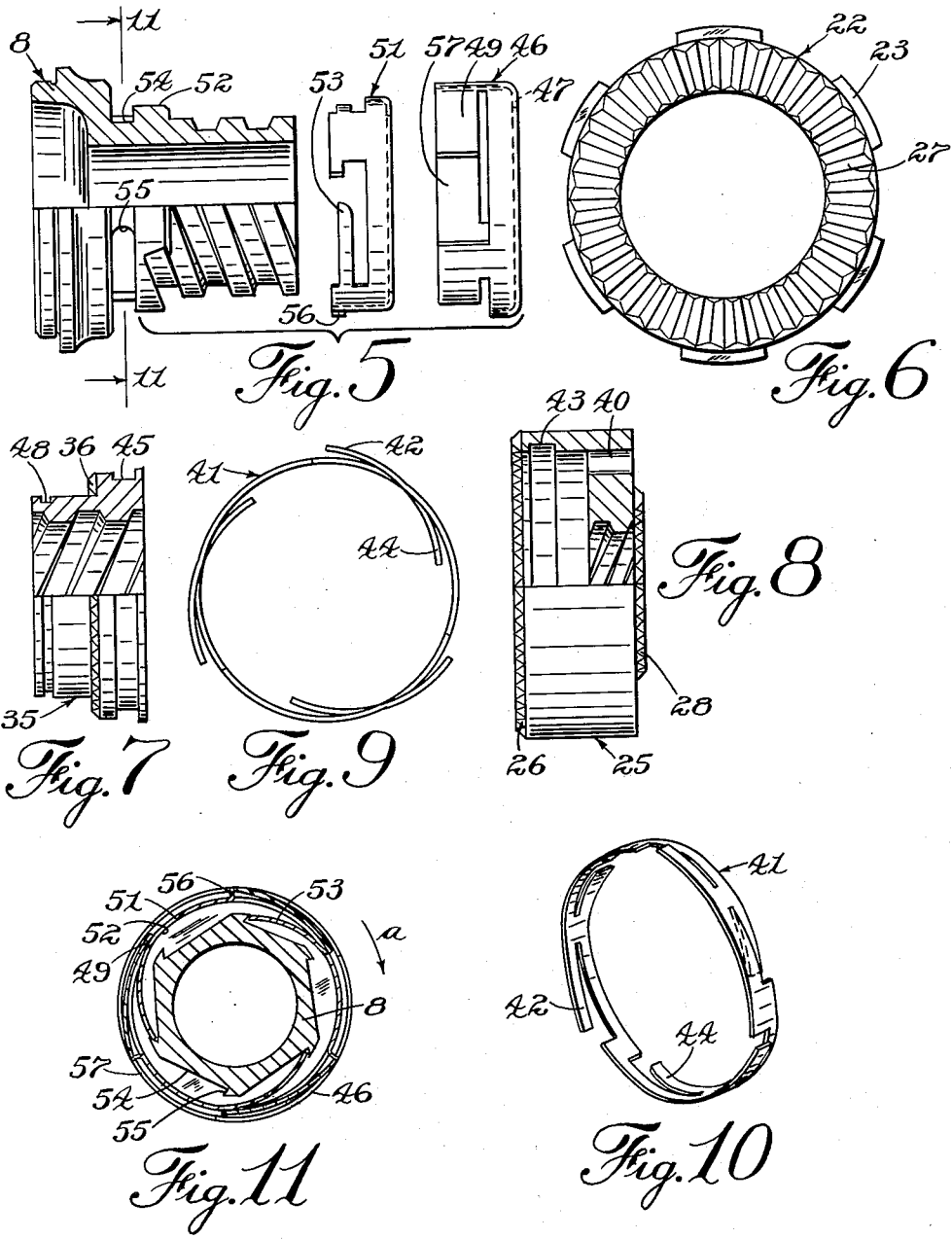

United States Patent Office 2,993,389
Patented July 25, 1961

2,993,389
SEMI-AUTOMATIC TWO-SPEED HUB GEARING FOR VELOCIPEDES
Hollis Kerns Gleasman, Elmira, N.Y., assignor to The Bendix Corporation, a corporation of Delaware
Filed Oct. 5, 1959, Ser. No. 844,592
12 Claims. (Cl. 74—750)

The present invention relates to a semi-automatic two-speed hub and coaster brake for velocipedes and the like, and more particularly to a device of this type in which the shift from one speed to the other is accomplished by a slight backward movement of the driving pedals insufficient to apply the brake.

It is an object of the present invention to provide a novel two-speed hub for velocipedes of the above type which is efficient and reliable in operation and simple and economical in construction.

It is another object to provide such a device in which the hub shell may be formed of extruded tubing with a minimum of machining operations.

It is another object to provide such a device in which the hub is rotated by means of a clutch member which is splined in the hub.

It is another object to provide such a device incorporating a disc type of back pedalling brake.

It is still another object to provide such a device in which the interior of the hub is traversed by axial spline grooves which serve to cooperate both with said clutch member and with the brake discs.

Further objects and advantages will be apparent from the following description taken in connection with the accompanying drawing in which:

FIG. 5 is a detail in side elevation, partly broken away and in section, of the high speed screw shaft, the indexing and blocking member and the selector sleeve shown in disassembled relation;

FIG. 6 is a detail in end elevation of the driven clutch member;

FIG. 7 is a detail in side elevation, partly broken away and in section, of the high speed driving clutch member;

FIG. 8 is a similar detail view of the low-speed driving clutch member;

FIG. 9 is a detail in end elevation of the retarder member for the high speed driving clutch member of the form illustrated in FIG. 1;

FIG. 10 is a detail in perspective of the retarder member illustrated in FIG. 9;

FIG. 11 is a cross section of the high speed screw shaft taken substantially on the plane of line 11—11 of FIG. 5, but showing the indexing and blocking member and the selector sleeve mounted thereon.

Figure 1:
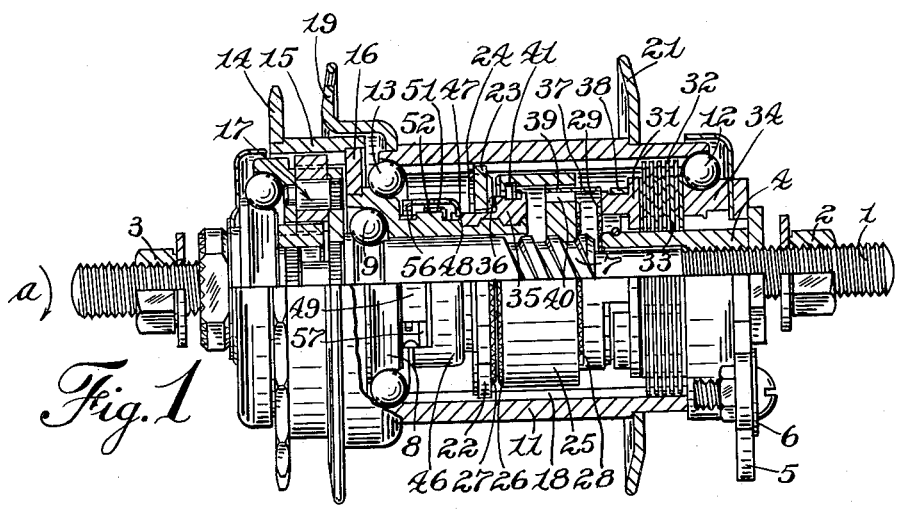
FIG. 1 is a side elevation, partly broken away and in section, of a preferred embodiment of the invention.

In FIG. 1 of the drawing, there is illustrated an axle 1 adapted to be clamped in a rear fork of a bicycle or the like by means of nuts 2 and 3. A brake anchor member 4 is threaded on said axle and prevented from rotation by a torque arm 5 non-rotatably mounted thereon and connected by a clip 6 to a bar of the vehicle frame.

A low-speed screw shaft 7 is rotatably mounted on the axle 1 adjacent the anchor member 4 and a high speed screw shaft 8 is journalled thereon by means of bearings 9. A hub shell 11 is rotatably mounted on the anchor member 4 and the high speed screw shaft 8 by means of bearings 12, 13, respectively.

A driving member in the from of a sprocket 14 adapted to be driven by a cain from the pedal shaft of the vehicle is arranged to rotate said screw shafts at different speeds. The high speed screw shaft 8 is rotated at the same speed as the sprocket 14 by means of an orbit gear 15 on which the sprocket is mounted, which gear is directly connected by an annular member 16 to said high speed screw shaft. The low-speed screw shaft 7 is rotated from the orbit gear 15 by means of planetary reduction gearing indicated generally by the numeral 17.

The interior of the hub shell 11 is cylindrical, and a plurality of equally spaced spline grooves 18 traverse said hub from end to end. Thus the hub shell may be made from extruded stock, the only mechanical operations required being the formation of the bearing cone surfaces at the end of the hub shell, and the formation of the seats for mounting the spoke flanges 19 and 21 on the exterior of the hub shell. A driven clutch member 22 (FIG. 6) is provided with circumferentially spaced radial lugs 23 slidably received in said grooves 18 to form a splined connection from said clutch member to the hub. A split lock ring 24 seated in a circumferential groove in the interior of the hub shell serves to position the driven clutch member in said hub.

A low speed driving clutch member 25 (FIG. 8) is threaded on the low speed screw shaft 7 and provided with teeth 26 adapted to mate with teeth 27 on the adjacent side of the driven clutch member 22. Clutch member 25 is also provided with laterally extending teeth 28 adapted to mate with teeth 29 on a brake pressure ring 31 splined on the anchor member 4.

A plurality of brake discs 32, are splined to the hub shell 11 by means of peripheral lugs slidably received in the spline grooves 18 of the hub, and brake discs 33 intercalated between the brake discs 32 are splined to the anchor member 4. The pack of brake discs 31, 33 bears against the bearing race 34 fixedly mounted on said anchor member and are arranged to be compressed by the brake ring 31 when actuated by the low-speed driving clutch member 25 responsive to backward rotation of the low-speed screw shaft 7.

A high speed driving clutch member 35 (FIG. 7) is threaded on the high speed screw shaft 8 in partial telescopic relation to the low-speed driving clutch member 25 and is provided with laterally extending teeth 36 which are also adapted to mesh with the teeth 27 of the driven clutch member 22 when brought into engagement therewith.

Figure 2:
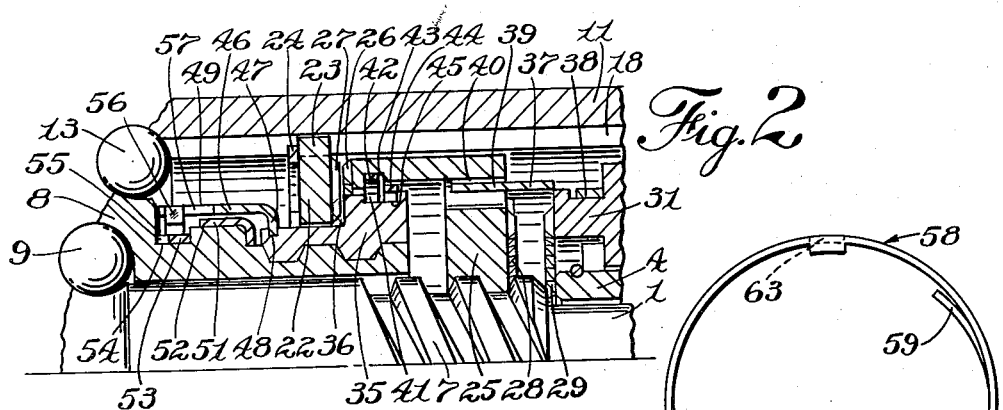
FIG. 2 is an enlarged detail of the structure shown in FIG. 1, showing the driving and driven clutch members as well as the indexing and selector members.

In order to ensure traversal of the driving clutch members responsive to rotation of the shafts on which they are threaded, a retarder ring 37 (FIG. 2) is provided having spring arms 38 bearing frictionally in a peripheral groove of the brake ring 31 and having axially extending arms 39 traversing openings 40 in the low-speed driving clutch member to form a spline connection therewith. Also, a retarder ring 41 (FIGS. 9 and 10) is located between the telescoping portions of the high speed and low-speed driving clutch members. The retarder 41 is provided with outwardly extending spring arms 42 bearing frictionally in an internal groove 43 in the low-speed driving clutch member and inwardly extending spring arms 44 bearing frictionally in a peripheral groove 45 in the high speed driving clutch member. The retarder ring 41 thus foms a frictional connection between the driving clutch members and also limits their relative axial movement to the lost motion provided by the width of the grooves 43, 45.

A selector sleeve 46 (FIG. 5) is fixedly mounted on the high speed driving clutch member 35, as by means of an inturned flange 47 forced into a groove 48 on the periphery of said clutch member. The selector sleeve is provided with a plurality of elastic arms 49 which are equally spaced circumferentially and bear frictionally on the perihpery of an indexing and blocking ring 51, which in turn is swiveled on an enlarged portion 52 of the high speed screw shaft.

The blocking ring 51 is provided with a plurality of spring pawl members 53 extending into a circumferential groove 54 in said high speed screw shaft to cooperate with ratchet teeth 55 (FIG. 11) at the bottom of said groove, thereby providing a ratcheting swivel connection between the indexing ring 51 and the high speed screw shaft so arranged to permit backward rotation of the high speed screw shaft with respect to said blocking ring.

The blocking ring 51 is also formed with radially extending blocking lugs 56 which are in the path of axial movement of the spring arms 49 of the selector sleeve 46 as the high speed driving clutch member moves toward engagement with the driven clutch member. The arrangement is such that when the lugs 56 of the indexing and blocking ring 51 are in alinement with the arms 49 of the the selector sleeve 46, the high speed driving clutch member 35 is prevented from traveling into engagement with the driven clutch member 22. However, when the lugs 56 are in alinement with the spaces 57 between the arms 49, the high speed driving clutch member is permitted to move into engagement and drive the driven clutch member 22.

There are twice as many ratchet teeth 55 on the high speed screw shaft 8 as there are arms 49 on the selector sleeve 46 whereby when the ring 51 is indexed step by step on the high speed screw shaft, the blocking lugs 56 are brought alternately into the path of said arms 49 and into the path of the spaces 57 between said arms.

In operation, starting with the parts in the positions illustrated in FIG. 1, with the high speed driving clutch member 35 in engagement with the driven clutch member 22, rotation of the sprocket 14 in the forward direction as indicated by the arrow (a) in FIG. 1 is transmitted directly through the orbit gear 15 and the high speed screw shaft 8 to the high speed driving clutch member 35 which accordingly rotates the driven clutch member 22 and the hub 11 at the same speed.

When it is desired to operate in low gear, the sprocket 14, orbit gear 15 and high speed screw shaft 8 are rotated backwards slightly by the operator. At this time, the indexing and blocking ring 51 does not rotate backward with the high speed screw shaft by reason of its frictional connection through the arms 49 of the selector sleeve 46, which in turn is prevented from rotation at this time by the retarders 41 and 37. The pawl arms 53 of the indexing and blocking ring 51 thus snap over one ratchet tooth 55 on the high speed screw shaft.

Subsequent forward rotation of the sprocket 14, orbit gear 15 and high speed screw shaft 8 will be transmitted to the indexing and blocking ring 51 by its pawl and ratchet connection whereby the radial blocking lugs 56 are brought into position to engage the arms 49 of the selector sleeve 46 and arrest the engaging movement of the high speed driving clutch member 35. The low-speed driving clutch member 25 is thus permitted to move into engagement with the driven clutch member 22 by reason of the forward rotation of the low-speed screw shaft 7 through the planetary reduction gearing 17, whereby the hub 11 is rotated in low gear.

The shifting back to high gear is accomplished in the identical manner by bringing the locking lugs 56 of the index ring 51 back into registry with the spaces 57 between the arms 49 of the selector sleeve 46.

It will be understood that the brake may be applied at any time by further backward rotation of the sprocket 14, which rotates the low-speed screw shaft 7 to cause the low-speed clutch member 25 to engage the brake ring 31 and compress the brake disc 32, 33 in the usual manner. By design the amount of backward rotation in applying the brake may, if desired, be sufficient to cause the pawl arms 53 of the indexing and blocking ring 51 to snap over two ratchet teeth 55 thereby insuring that further forward rotation will cause the hub to be driven in the last selected gear ratio.

Figures 3, 4:
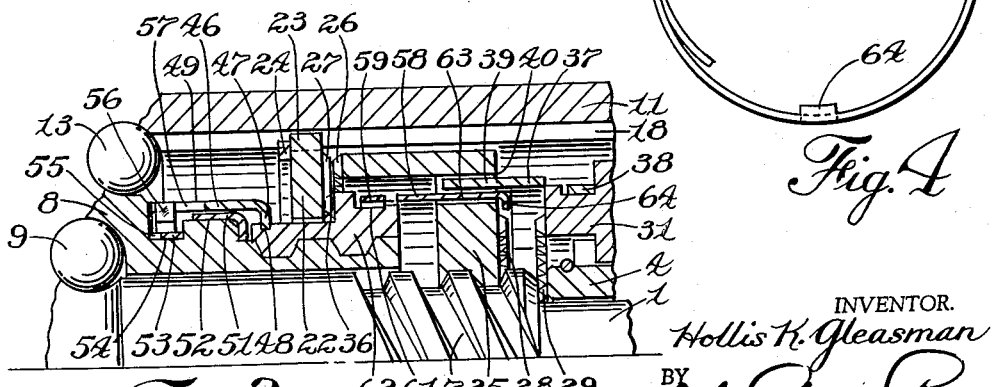
FIG. 3 is a view similar to FIG. 2 showing a modified form of the retarder member for the high speed driving clutch member.
FIG. 4 is a detail in end elevation of said modified retarder.

In FIGS. 3 and 4 of the drawing there is illustrated a modified form of spring retarder for the high speed driving clutch member comprising a sleeve 58 having a spring arm 59 bearing frictionally in a peripheral groove 61 of the high speed driving clutch member 62 and having arms 63 traversing the openings 40 in the low-speed driving clutch member 25 and formed with terminal hooks 64 limiting the separation of the driving clutch members.

It will be understood that the reason for limiting the relative axial movement of the driving clutch members is for the purpose of preventing undesired forcible application of the brake when the vehicle is rolled backward as explained in detail in applicant's prior applications, Serial No. 706,363, filed December 31, 1957, now Patent Number 2,914,152; and the joint application of Hood and Gleasman, Serial No. 759,054, filed September 4, 1958, now Patent Number 2,957,559.

Although certain structure has been shown and described in detail it will be understood that changes may be made in the design and arrangement of the parts without departing from the spirit of the invention.

I claim:

1. In a two-speed hub for velocipedes and the like a fixed axle, an anchor member non-rotatably mounted thereon, a low-speed screw shaft journalled on the axle, a high speed screw shaft rotatably mounted on the low-speed screw shaft, a hollow cylindrical hub rotatably mounted on the anchor member and the high speed screw shaft, means for rotating said screw shafts at different gear ratios from a common driving member, a driven clutch member slidably but non-rotatably mounted in the interior of the hub, high speed and low-speed driving clutch members, threaded on their respective shafts for selective engagement with the driven clutch member responsive to forward rotation of said shafts, a plurality of brake members splined to the interior of the hub, cooperating brake members splined on the anchor member, and means responsive to backward traversal of one of said driving clutch members for compressing said brake members.

2. A two-speed hub as set forth in claim 1 in which the interior of said hub is traversed by a plurality of axial spline grooves, and said driven clutch element and said first mentioned brake members are provided with radial lugs slidably received in said grooves, and a thrust ring fixedly mounted in the interior of the hub serves to limit the movement of the driven clutch member in the direction away from said brake elements.

3. A two-speed hub as set forth in claim 1 including further, means under the control of the operator for preventing the high speed driving clutch member from engaging the driven clutch member.

4. A two-speed hub as set forth in claim 3 including further, retarder means for frictionally resisting rotation of the driving clutch members to ensure traversal responsive to rotation of their respective screw shafts, said retarder means also serving to limit the axial separation of said driving clutch members.

5. A two-speed hub as set forth in claim 4 in which the driving clutch members are telescopically arranged, the innermost driving clutch member having a peripheral groove, and the outermost driving clutch member having a circular groove in its interior surface in approximate registry with said peripheral groove, said retarder means including a retarder ring having spring arms bearing in both said grooves to frictionally oppose relative rotation of said driving clutch members.

6. A two-speed hub as set forth in claim 4 in which the driving clutch members are telescopically arranged, the innermost of said driving clutch members having a peripheral groove, and the outermost of said clutch members having a radial opening formed therein, said retarder means including a retarder ring having a radial spring arm frictionally bearing in said groove and an axial projection cooperating with said radial opening to form a splined connection therewith to frictionally oppose relative rotation of said driving clutch members.

7. A two-speed hub as set forth in claim 1 further including retarder means for frictionally resisting rotation of the driving clutch members to ensure traversal of said driving clutch members responsive to rotation of their respective screw shafts, said retarder means including means thereon cooperating with said driving clutch members for limiting the axial separation of said driving clutch members.

8. A two-speed hub as set forth in claim 1 in which the driving clutch members are telescopically arranged, and further including retarder means cooperating with said driving clutch members to frictionally resist rotation of said driving clutch members.

9. In the device set forth in claim 8 the retarder means comprising a first retarder ring frictionally coupled to said axle and having a splined connection with one of said driving clutch members, a second retarder ring interposed between the telescoped portion of said driving clutch members frictionally engaging at least one of said telescoped clutch portions.

10. In the device set forth in claim 9 said second retarder ring including means cooperating with said driving clutch members for limiting the axial separation of said driving clutch members.

11. In the device set forth in claim 9 the telescoped portions of said driving clutch members having substantially opposed grooves formed therein, said second retarder means including a plurality of spring arms bearing in said grooves to provide said frictional engagement.

12. In the device set forth in claim 9 the telescoped portions of the other of said driving clutch member includes a peripheral groove formed therein, said second retarder ring including a spring arm bearing in said groove and an axial projection cooperating with said splined connection in said one driving clutch member to thereby provide said frictional engagement.

No references cited.